US 6,556,302 B2

(12) United States Patent
Ishihara

(10) Patent No.: US 6,556,302 B2
(45) Date of Patent: Apr. 29, 2003

(54) APPARATUS FOR AND METHOD OF DETERMINING INFORMATION RECORD MEDIUM

(75) Inventor: Kanji Ishihara, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 37 days.

(21) Appl. No.: 09/794,115

(22) Filed: Feb. 28, 2001

(65) Prior Publication Data
US 2001/0017348 A1 Aug. 30, 2001

(30) Foreign Application Priority Data

Feb. 28, 2000 (JP) ........................................ 2000-056066

(51) Int. Cl.[7] .............................................. G11B 3/90
(52) U.S. Cl. .................... 356/445; 356/71; 356/448; 369/58; 369/94; 369/44.27; 369/54; 369/44.25
(58) Field of Search ................ 356/445, 71, 448; 369/58, 94, 44.27, 54, 44.25

(56) References Cited

U.S. PATENT DOCUMENTS 5,963,523 A * 10/1999 Kayama et al. .......... 369/53.22
6,327,234 B1 * 12/2001 Kamiyama et al. ...... 369/44.27

FOREIGN PATENT DOCUMENTS

| JP | 06-314465 | 11/1994 |
| JP | 10-241268 | 9/1998 |
| JP | 11-176073 | 7/1999 |
| WO | WO 98/54704 | 12/1998 |

\* cited by examiner

Primary Examiner—John R. Lee
Assistant Examiner—Zia R. Hashmi
(74) Attorney, Agent, or Firm—Morgan, Lewis & Bockius LLP

(57) ABSTRACT

An apparatus for determining an information record medium is provided. The apparatus includes an emitting device, a light receiving device and a determining device. The emitting device respectively emits a plurality of light beams whose wave lengths are different from each other. Then, the light receiving device receives respective reflection lights from an information record medium of the emitted respective light beams, and outputs light reception signals respectively corresponding to the received reflection lights. After that, the determining device determines a type of the information record medium in accordance with a ratio between the outputted respective light reception signals.

16 Claims, 4 Drawing Sheets

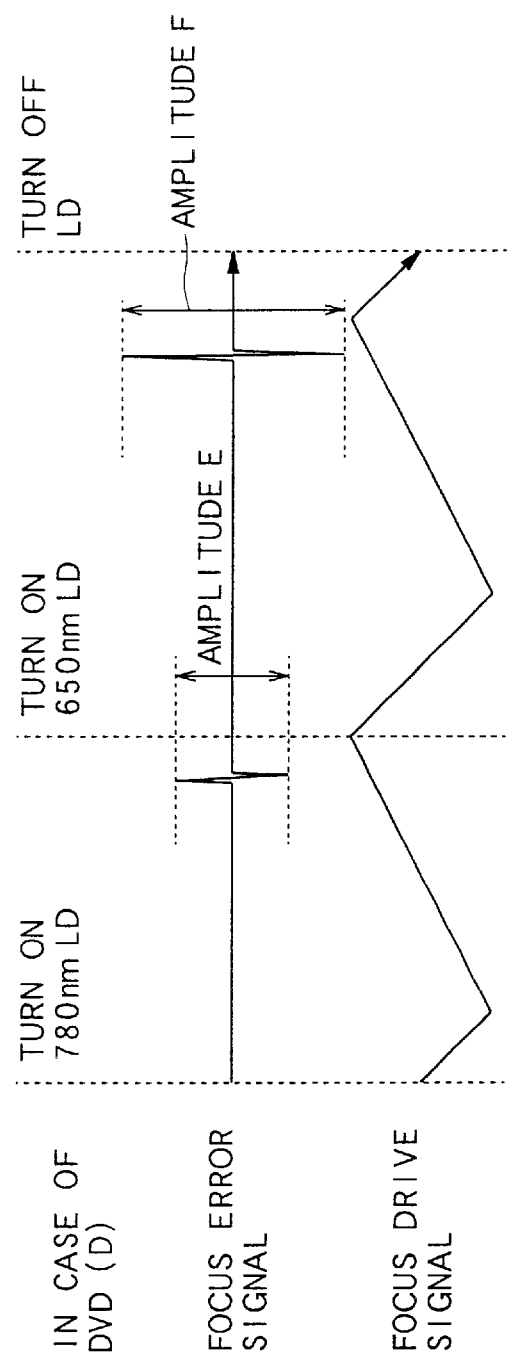
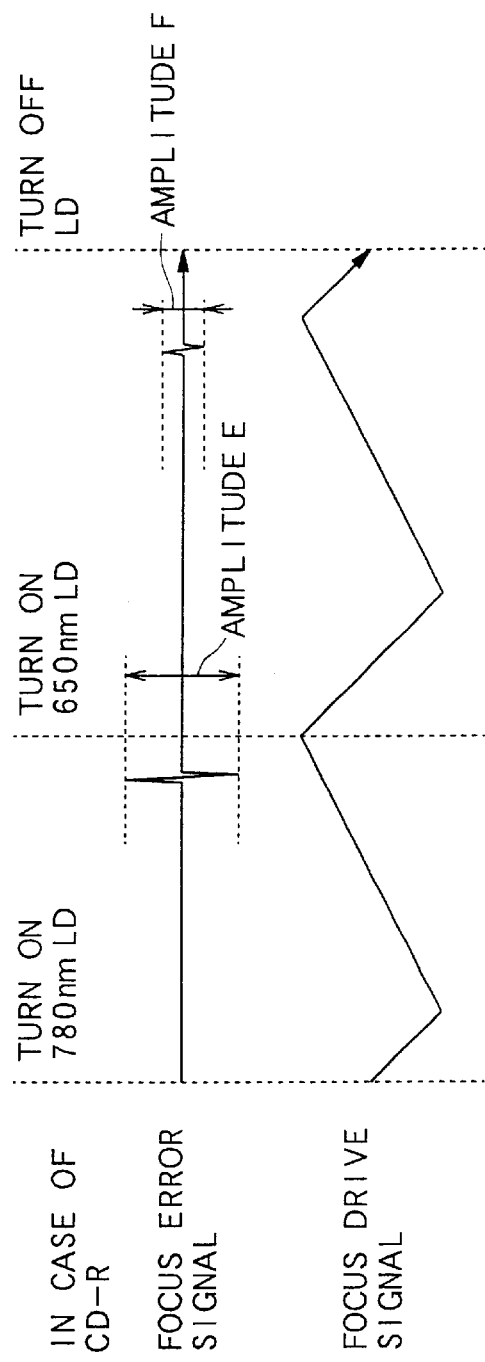
FIG. 4A
FIG. 4B

APPARATUS FOR AND METHOD OF DETERMINING INFORMATION RECORD MEDIUM

BACKGROUND OF THE INVENTION

1. Field of the Invention

The present invention relates to an apparatus for and a method of determining an information record medium, and more particularly relates to the apparatus for and the method of determining the information record medium, which can determine a type of the information record medium on which an information is optically recorded and reproduced.

2. Description of the Related Art

Recently, an information reproducing apparatus has been generalized which is superior in so-called compatibility and can reproduce information recorded on a plurality of types of optical discs that are different from each other.

On the other hand, when information is reproduced from the optical disc, typically, in order to make a focal point of a light beam for the reproduction coincide with a position on an information record surface of the optical disc, it is necessary to carry out the reproduction while carrying out a so-called focus servo control, tracking servo control or the like.

In the conventional various optical discs, their gain characteristics, equalizer characteristics, etc. which should be set in the above-mentioned respective servo controls are typically different from each other because of the differences between their structures.

Thus, when one information reproducing apparatus reproduces the information recorded on the respective optical discs, it is necessary to start the reproduction after the respective characteristics (the equalizer characteristics, the gain characteristics, etc.) in the information reproducing apparatus are optimized in accordance with a type of each optical disc. To this end, prior to the execution of the reproduction, it is necessary to determine a kind of an optical disc currently being loaded in the information reproducing apparatus and then optimize the gain characteristics, etc., in accordance with the determined result.

For this reason, various "type determining methods" of determining a type of an optical disc using a light beam for recording or reproducing have been proposed.

However, a so-called CD-R (Compact Disc-Recordable), which can record information only one time and which has been recently generalized, has a problem that it can not be discriminated from other optical discs even if any of the conventional type determining methods is used.

In a case of a light beam used in a conventional information reproducing apparatus for CD (Compact Disc), a record format and reflection characteristics to the light beam for the CD-R are substantially equal to those of another CD, etc. Thus, it is impossible to discriminate between the CD-R and the CD, etc., even if any of the conventional type determining methods using the light beam is used.

On the other hand, in recent years, it is necessary to reproduce the CD-R at hyper-multiplicative speed (e.g. 8×(eightfold), 10×(tenfold), 20×(twentyfold) . . . ). This case requires that the CD-R should be rotated at high speed. If information is accurately reproduced from the CD-R being rotated at high speed, the gain characteristics or the equalizer characteristics, which are acceptable at the time the CD-R is rotated at low speed even if they are adjusted roughly the same as those of the CD, needs to be optimized only for the CD-R. For this reason, discriminating the CD-R from other optical discs prior to the reproduction of the information has become increasingly significant.

SUMMARY OF THE INVENTION

The present invention is proposed in view of the above mentioned requests. It is therefore an object of the present invention to provide an apparatus for and a method of determining an information record medium, which can optically accurately determine a type of the information record medium among a plurality of types of information record media including CD-R.

The above object of the present invention can be achieved by an apparatus for determining an information record medium in accordance with the present invention. The apparatus has an emitting device for respectively emitting a plurality of light beams whose wave lengths are different from each other; a light receiving device for receiving respective reflection lights from an information record medium of the emitted respective light beams, and outputting light reception signals respectively corresponding to the received reflection lights; and a determining device for determining a type of the information record medium in accordance with a ratio between the outputted respective light reception signals.

According to the apparatus, the emitting device respectively emits a plurality of light beams whose wave lengths are different from each other. Then, a light receiving device receives respective reflection lights from an information record medium of the emitted respective light beams, and outputs light reception signals respectively corresponding to the received reflection lights. After that the determining device determines a type of the information record medium in accordance with a ratio between the outputted respective light reception signals.

Thus, a type of an information record medium is determined in accordance with a ratio between respective light reception signals respectively obtained by radiating a plurality of kinds of light beams to an information record medium. Therefore, the type can be determined optically accurately. As a result, after the type is accurately determined, recording or reproducing of the information on the information record medium can be reliably performed.

In one aspect of the apparatus for determining an information record medium of the present invention, the emitting device respectively emits a first light beam and a second light beam in which their wave lengths are different from each other. Then, the light receiving device receives a reflection light of the first light beam from the information record medium, and outputs a first light reception signal, and also receives a reflection light of the second light beam from the information record medium, and outputs a second light reception signal. After that, the determining device determines a type of the information record medium in accordance with a ratio between the first light reception signal and the second light reception signal.

Thus, the type of an information record medium is determined n accordance with a ratio between respective light reception signals respectively obtained by radiating two kinds of light beams to an information record medium. Therefore, the type can be determined optically accurately. As a result, after the type is accurately determined, recording or reproducing of the information on the information record medium can be reliably performed.

In another aspect of the apparatus for determining an information record medium of the present invention, a wave length of the first light beam is a wave length within a range between 770 nano-meters and 795 nano-meters, and a wave length of the second light beam is a wave length within a range between 630 nano-meters and 655 nano-meters.

Thus, a light beam used for recording or reproducing an information on or from an information record medium can be jointly used to then determine its type. Therefore, the configuration as an apparatus for determining an information record medium can be simplified.

In another aspect of the apparatus for determining an information record medium of the present invention, the determining device determines whether the information record medium is CD-R or another information record medium except the CD-R.

Thus, a determination for CD-R which was impossible until now can be optically done.

In another aspect of the apparatus for determining an information record medium of the present invention, the determining device compares the ratio with a predetermined threshold corresponding to a reflection factor of the light beam in the information record medium whose type should be determined, and so that it determines the type of the information record medium.

Thus, the type of an information record medium is determined in accordance with a comparison between a preset threshold and the above-mentioned ratio. Therefore, the type can be determined optically further surely and easily.

In another aspect of the apparatus for determining an information record medium of the present invention, the apparatus further includes a presence or absence determining device. The device determines a presence or absence of the information record medium, in accordance with any light reception signal of the outputted light reception signals, prior to a determination of the type.

Thus, a presence or absence of an information record medium is determined prior to a determination of its kind by using any of obtained light reception signals.

In another aspect of the apparatus for determining an information record medium of the present invention, the emitting device last emits the light beam, which is first used after the determination of the type, in the determination of the type.

Thus, a light beam used for recording or reproducing after a type determination is last used in the type determination. Therefore, the recording or reproducing processing can be performed without switching an emitting device.

The above object of the present invention can be achieved by a method of determining an information record medium in accordance with the present invention. The method has the process of respectively emitting a plurality of light beams whose wave lengths are different from each other; the process of receiving respective reflection lights from an information record medium of the emitted respective light beams, and outputting light reception signals respectively corresponding to the received reflection lights; and the process of determining a type of the information record medium in accordance with a ratio between the outputted respective light reception signals.

According to the method, the process of emitting a plurality of light beams respectively emits a plurality of light beams whose wave lengths are different from each other. Then, the process of receiving reflection lights receives respective reflection lights from an information record medium of the emitted respective light beams, and outputting light reception signals respectively corresponding to the received reflection lights. After that the process of determining a type of the information record medium determines a type of the information record medium in accordance with a ratio between the outputted respective light reception signals.

Thus, a type of an information record medium is determined in accordance with a ratio between respective light reception signals respectively obtained by radiating a plurality of kinds of light beams to an information record medium. Therefore, the type can be determined optically accurately. As a result, after the type is accurately determined, recording or reproducing of the information on the information record medium can be reliably performed.

In one aspect of the method of determining an information record medium of the present invention, the process of emitting a plurality of light beams respectively emits a first light beam and a second light beam in which their wave lengths are different from each other. Then, the process of receiving respective reflection lights receives a reflection light from the information record medium of the first light beam, and outputs a first light reception signal, and also receives a reflection light from the information record medium of the second light beam, and outputs a second light reception signal. After that, the process of determining the type determines the type in accordance with a ratio between the first light reception signal and the second light reception signal.

Thus, the type of an information record medium is determined in accordance with a ratio between respective light reception signals respectively obtained by radiating two kinds of light beams to an information record medium. Therefore, the type can be determined optically accurately. As a result, after the type is accurately determined, recording or reproducing of the information on the information record medium can be reliably performed.

In another aspect of the method of determining an information record medium of the present invention, a wave length of the first light beam is a wave length within a range between 770 nano-meters and 795 nano-meters, and a wave length of the second light beam is a wave length within a range between 630 nano-meters and 655 nano-meters.

Thus, a light beam used for recording or reproducing an information on or from an information record medium can be jointly used to then determine its type. Therefore, the configuration as an apparatus for determining an information record medium can be simplified.

In another aspect of the method of determining an information record medium of the present invention, the process of determining the type determines whether the information record medium is CD-R or another information record medium except the CD-R.

Thus, a determination for CD-R which was impossible until now can be optically done.

In another aspect of the method of determining an information record medium of the present invention, the process of determining the type compares the ratio with a predetermined threshold corresponding to a reflection factor of the light beam in the information record medium whose type should be determined, and so that it determines the type of the information record medium.

Thus, the type of an information record medium is determined in accordance with a comparison between a preset threshold and the above-mentioned ratio. Therefore, the type can be determined optically further surely and easily.

In another aspect of the method of determining an information record medium of the present invention, the method further includes the process of determining a presence or absence of the information record medium, in accordance with any light reception signal of the outputted light reception signals, prior to a determination of the type.

Thus, a presence or absence of an information record medium is determined prior to a determination of its kind by using any of obtained light reception signals.

In another aspect of the method of determining an information record medium of the present invention, the process of emitting a plurality of light beams last emits the light beam, which is first used after the determination of the type, in the determination of the type.

Thus, a light beam used for recording or reproducing after a type determination is last used in the type determination. Therefore, the recording or reproducing processing can be performed without switching an emitting device.

BRIEF DESCRIPTION OF THE DRAWINGS

FIG. 4 is a timing chart showing type determining processing according to an embodiment.

DETAILED DESCRIPTION OF THE PREFERRED EMBODIMENTS

A preferred embodiment of the present invention will be explained below with reference to FIGS. 1 to 4.

The following embodiment is the embodiment in which the present invention is applied to processing for determining a type of an optical disc, in an information reproducing apparatus that can reproduce information recorded on a plurality of kinds of optical discs.

Figure 1:
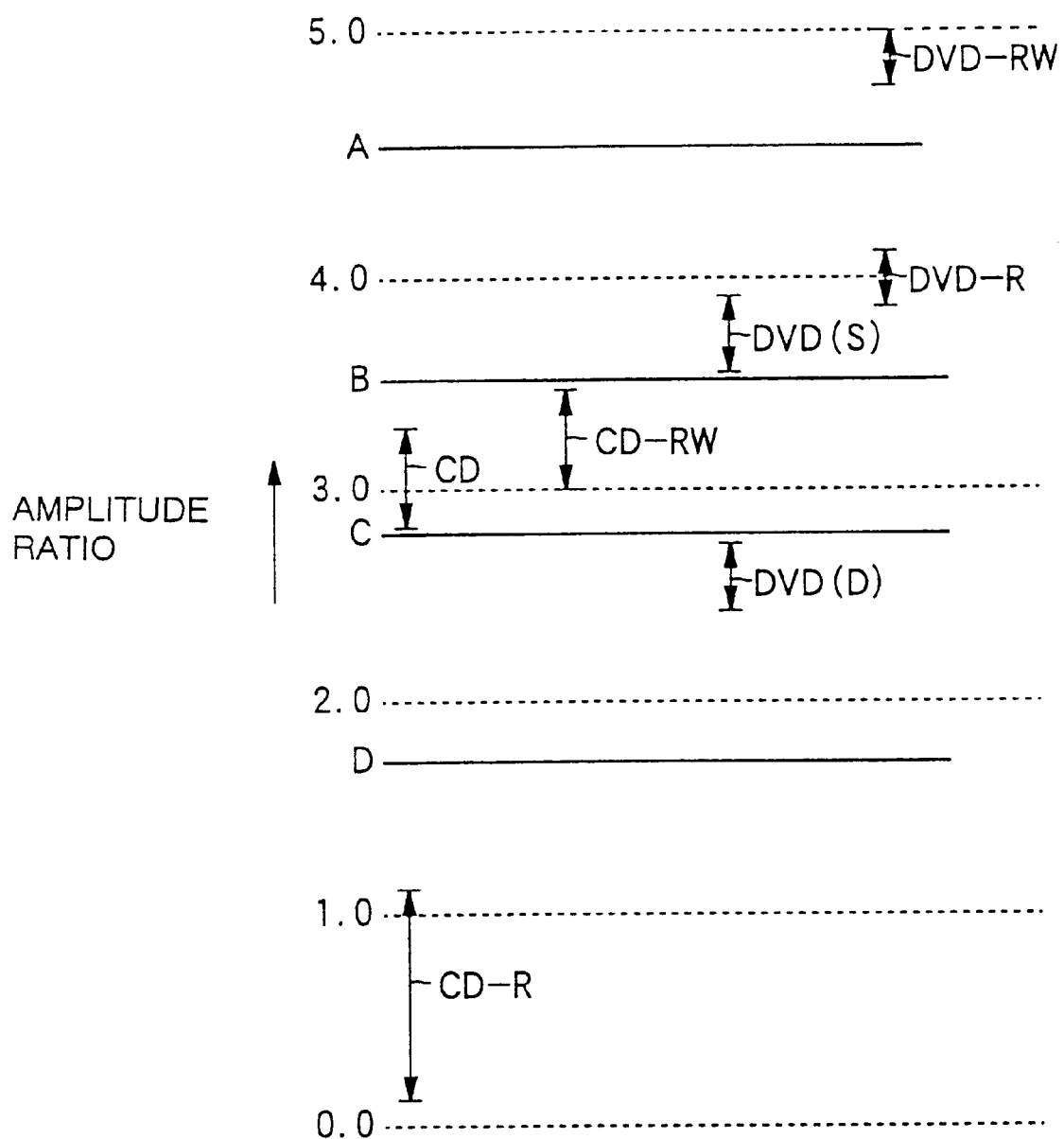
FIG. 1 is a view describing a principle of the present invention.
Figure 2:
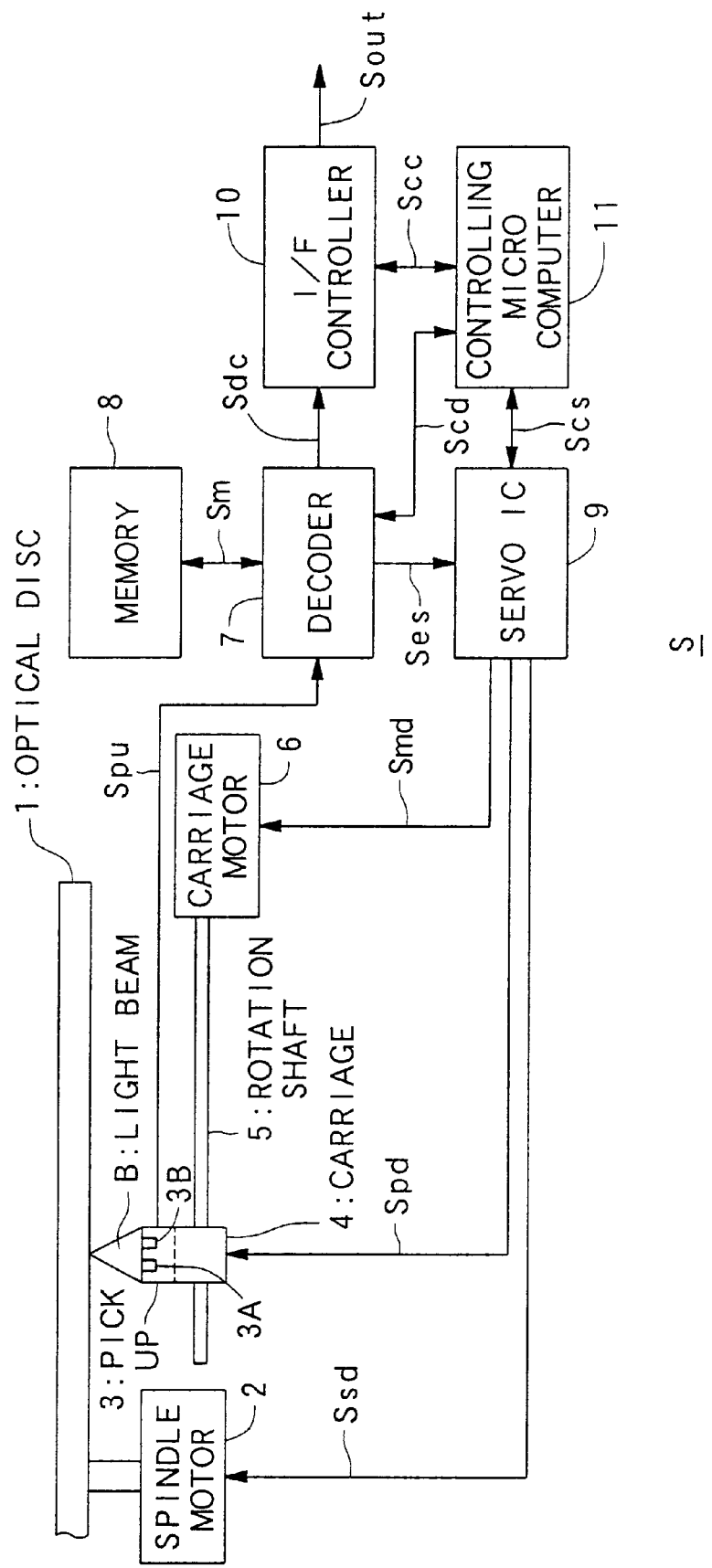
FIG. 2 is a block diagram showing a schematic configuration of an information reproducing apparatus according to an embodiment.
Figure 3:
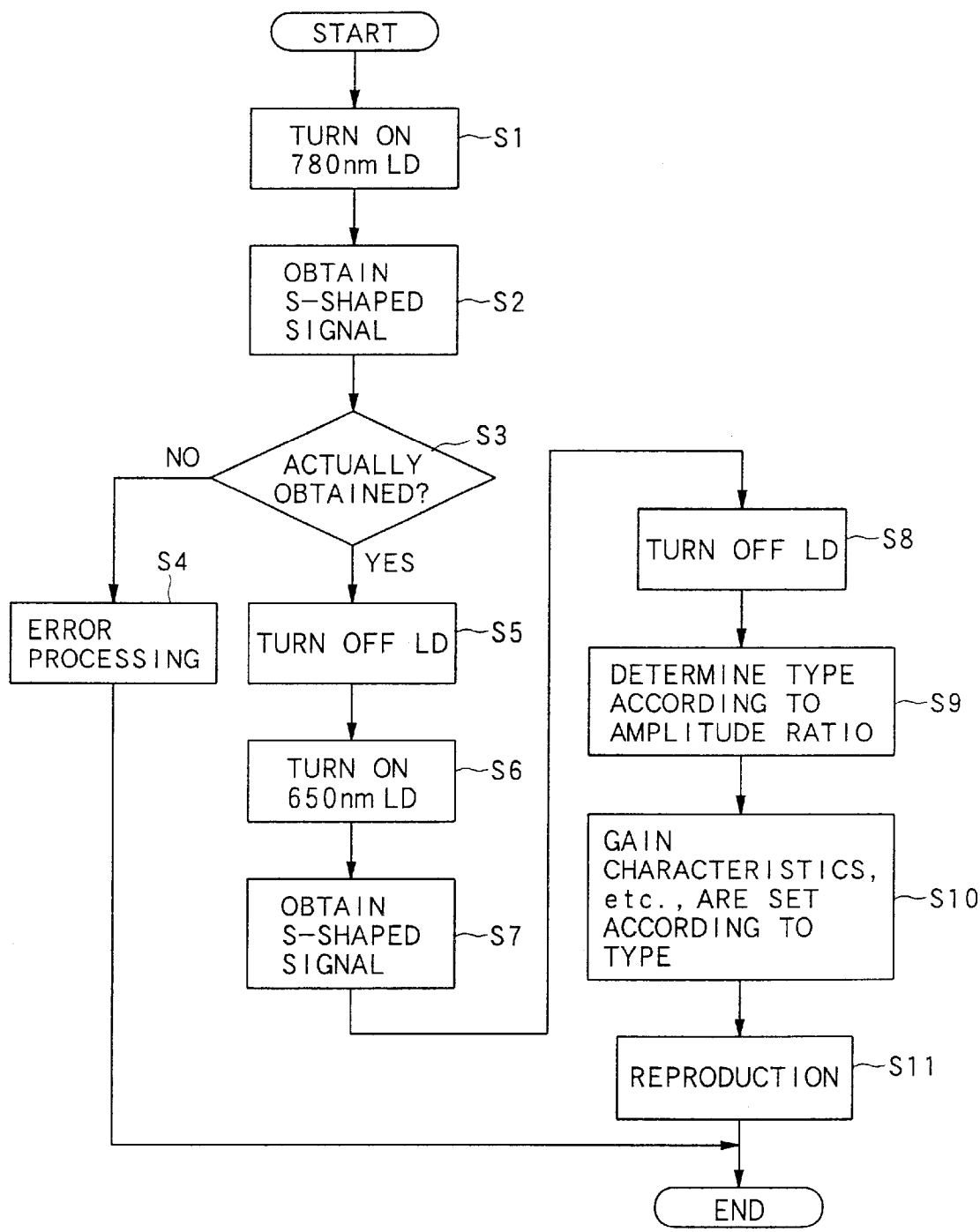
FIG. 3 is a flowchart showing type determining processing according to an embodiment.

FIG. 1 is a view describing the principle of the present invention. FIG. 2 is a block diagram showing the schematic configuration of the information reproducing apparatus according to the embodiment. FIG. 3 is a flowchart showing type determining processing according to the embodiment. FIG. 4 is a timing chart showing the type determining processing according to the embodiment.

(I) Principle of the Invention

At first, the principle of the present invention is described with reference to FIG. 1 prior to a specific explanation of the embodiment.

Now, as an information record medium from which information is optically reproduced in a manner similar to CD, there are CD-R, CD-RW (CR-Rewritable), DVD(S) (DVD-Single layer), DVD(D) (DVD-Dual layer), DVD-R (DVD-Recordable), DVD-RW (DVD-Re-recordable), etc.

The CD-R is an optical disc for recording and reproducing, which has a recording capacity substantially similar to that of the CD and on which information can be written only one time. The CD-RW is an optical disc for recording and reproducing, which has a recording capacity substantially similar to that of the CD and on which information can be recorded and reproduced a plurality of times. The DVD(S) is an optical disc for reproducing-only, in which a record capacity is increased by several times that of CD. The DVD(D) is an optical disc for reproducing-only, in which a record capacity is increased by ten-odd times that of the CD having a two-layer information record surface. The DVD-R is an optical disc for recording and reproducing, which has a record capacity substantially similar to that of the DVD(S) and on which information can be written only one time. The DVD-RW is an optical disc for recording and reproducing, which has a record capacity substantially similar to that of the DVD(S) and on which information can be recorded and reproduced a plurality of times.

Moreover, among them, it is said that the DVD(D), the DVD(S), the DVD-R and the DVD-RW can carry out the recording or reproducing operation by using a light beam having a wave length of, for example, 650 nano-meters. On the other hand, it is said that the CD-R, the CD and the CD-RW can carry out the recording or reproducing operation by using a light beam having a wave length of 780 nano-meters longer than that of the above-mentioned light beam.

In the respective optical discs, the reflection factors to the above-mentioned respective light beams are different from each other, because of the difference between materials of reflection films included in the respective optical discs, which are reflection films for reflecting radiated light beams, and a difference between laminated structures themselves of the optical discs.

On the other hand, an information reproducing apparatus that can reproduce all the information recorded on the respective optical discs is provided with both a laser diode for emitting the light beam having the wave length of 650 nano-meters and a laser diode for emitting the light beam having the wave length of 780 nano-meters.

Therefore, in the present invention, when a type of an optical disc loaded in the information reproducing apparatus is determined at the time of reproducing of information in the information reproducing apparatus, the above-mentioned two kinds of the light beams are radiated to the loaded optical disc, respectively and separately. Then, ratio between amplitudes of two kinds of light reception signals is calculated. Specifically, the light reception signals are light reception signals such as a so-called focus error signal, tracking error signal, RF (Radio Frequency) signal, etc.) generated by respectively receiving their reflection lights. Then, the type of the loaded optical disc is determined in accordance with its amplitude ratio.

More specifically, a plurality of thresholds with respect to the amplitude ratios are set as denoted by symbols A to D of FIG. 1 by using the fact that the amplitude ratios indicate the distribution shown in FIG. 1 in accordance with the types of the optical discs. Then, the type of the loaded optical disc is determined in accordance with a relation between the amplitude ratio generated corresponding to the loaded optical disc and the respective thresholds. Then, the reproduction is done.

In the present invention, a type of an optical disc is not determined in accordance with a difference of a reflection factor from any one of the light beams, and the type is determined in accordance with the amplitude ratio between the light reception signals corresponding to the two kinds of the light beams. That is why, in the above-mentioned respective optical discs, there is the variation between the reflection factors even in the same type of the optical discs. Moreover, even in the above-mentioned information reproducing apparatus, there may be so-called individual differences with regard to light reception characteristics in the respective light beams. Thus, the type is determined in accordance with the amplitude ratio in order to compensate for the variations or the individual differences and stably determine the type.

(II) Embodiment

The embodiment of the present invention will be specifically described below with reference to FIGS. 2 to 4.

At first, the schematic configuration and the operation of the information reproducing apparatus according to the embodiment are described with reference to FIG. 2.

As shown in FIG. 2, an information reproducing apparatus S for reproducing information recorded on an optical disc 1, which is any one of the above-mentioned seven types of optical discs, is provided with a spindle motor 2, a pickup 3 serving as a light receiving device, a carriage 4, a rotation shaft 5, a carriage motor 6, a decoder 7, a memory 8, a servo IC 9 serving as a determining device and a presence or absence determining device, an I/F (Inter Face) controller 10 and a controlling micro computer 11.

The schematic operation will be described below.

At first, the pickup 3 containing both a laser diode (hereafter, referred to as a second laser diode) 3B serving as an emitting device for emitting a light beam having a wave length of 650 nano-meters and a laser diode (hereafter, referred to as a first laser diode) 3A serving as an emitting device for emitting a light beam having a wave length of 780 nano-meters radiates an information reproducing light beam B to the optical disc 1 that is rotated at a predetermined rotation number by the spindle motor 2 driven by a later-described spindle drive signal Ssd, and receives its reflection light, and accordingly generates a detection signal Spu corresponding to the information to be reproduced, and then provide an outputs to the decoder 7.

At this time, a light beam emitted as the light beam B is selected from between the two kinds of light beams whose wave lengths are different from each other in accordance with the kind of the optical disc 1 determined by a later-described type determining processing.

Moreover, the light beam B is focused onto an information record surface of the optical disc 1 by an objective lens (not shown) in the pickup 3, and a light spot is formed on the information record surface.

Then, the objective lens is shifted in the vertical or horizontal direction to the information record surface by an actuator, which supports and shifts the objective lens, is not shown in FIG. 3, and is run by a later-described pickup servo signal Spd, so that the gap between a focal point of the light beam B and a position of an information track on the surface, on which information is recorded and reproduced, in the vertical direction to the surface and the gap between the focal point and the position of the information track in the horizontal direction to the surface are compensated for. Namely, tracking servo control and focus servo control is performed. Then, the information is reproduced while the control is performed.

If the necessity of further shifting the focal point beyond the limits of shifting in the radius direction of the objective lens arises in the tracking servo control with regard to the radius direction of the optical disc 1, the tracking servo control is continued since the carriage 4 supporting the pickup 3 is shifted in the radius direction, which is the left or right direction of FIG. 3, while supporting the pickup 3.

The shift of the carriage 4 is implemented since the carriage motor 6 run by a later-described motor drive signal Smd rotates the threaded rotation shaft 5 so that the carriage 4 having a partial nut engaged with the thread on the rotation shaft 5 is shifted in a direction parallel to a central axis of the rotation shaft 5.

The control for switching between the first laser diode 3A and the second laser diode 3B is carried out under the control of the servo IC 9 using a switching control signal included in the pickup servo signal Spd.

Next, the decoder 7, while sending a control signal Scd to and receiving it from the controlling micro computer 11, and also sending necessary information as a memory signal Sm to and receiving it from the memory 8, extracts a reproduction signal Sdc corresponding to information recorded on the optical disc 1 from the detection signal Spu; provides an output to the I/F controller 10; extracts the so-called focus error signal and the tracking error signal from the detection signal Spu; generates an error signal Ses including them, and provides an output to the servo IC 9.

Accordingly, the I/F controller 10, while sending a control signal Scc to and receiving it from the control micro computer 11, performs a preset processing for interfacing to input the reproduction signal Sdc and to generate an output signal Sout corresponding to the information recorded on the optical disc 1, and then provides an output to an external personal computer, etc.

On the other hand, the servo IC 9 where the error signal Ses is provided, while sending the control signal Scs to and receiving it from the control micro computer 11, generates the pickup servo signal Spd for driving the actuator in the pickup 3 in accordance with the focus error signal and the tracking error signal included in the error signal Ses, provides an output to the pickup 3, generates the spindle drive signal Ssd for controlling the rotation of the spindle motor 2, and then provides an output to the spindle motor 2.

In addition to those operations, the servo IC 9 generates the motor drive signal Smd, in order to shift the carriage 4 in the radius direction of the optical disc 1, in accordance with the tracking error signal, and provides an output to the carriage motor 6.

Moreover, in a later-described type determining processing, the servo IC 9 controls so as to turn on and off the first laser diode 3A and turn on and off the second laser diode 3B by using the switching control signal.

The above-mentioned series of the operations are the operations when the information recorded on the optical disc 1 is reproduced. However, the type determining processing of the optical disc 1 according to the present invention as described later is carried out prior to a start of the reproduction operation. Moreover, the settings of the gain characteristics, the equalizer characteristics, etc., in the servo IC 9 are carried out in accordance with the result of the type determining processing. The type determining processing uses the focus error signal as described later.

The type determining processing according to the embodiment will be described below with reference to FIGS. 3, 4. The kind determining processing as described below is the processing mainly carried out by the servo IC 9.

In the kind determining processing prior to the start of reproducing of the information, the first laser diode 3A for emitting the light beam B having the wave length of 780 nano-meters is firstly turned on (Step S1). Then, a so-called S-shaped signal included in the focus error signal is obtained in accordance with the reflection light from the optical disc 1 of the light beam B (Step S2).

Then, it is determined whether or not the S-shaped signal is actually obtained (Step S3). If the S-shaped signal can not be obtained (Step S3; NO), it is determined that the optical disc 1 is not actually loaded into the information reproducing apparatus S. Then, a predetermined error processing is done (Step S4), and the type determining processing is terminated.

In the determination of the presence or absence of the loading of the optical disc 1, the light beam B having the wave length of 780 nano-meters is used. The light beam having the wave length of 650 nano-meters is not almost reflected in the CD-R as shown in FIG. 1. Thus, if the loaded optical disc 1 is the CD-R, when the light beam having the wave length of 650 nano-meters is used to determine the presence or absence of the loading of the optical disc 1, there may be the possibility that the CD-R is determined to be not loaded (Step S3; NO) although it is actually loaded. That is why the light beam B having the wave length of 780 nano-meters is used to determine the presence or absence of the loading of the optical disc 1.

On the other hand, if the S-shaped signal can be obtained in the determination at the step S3 (Step S3; YES), an amplitude value of the obtained S-shaped signal is assumed to be a value E, and it is temporarily stored in a memory (not shown) in the servo IC 9. The first laser diode 3A that is turned on is turned off (Step S5). Then, the second laser diode 3B for emitting the light beam B having the wave length of 650 nano-meters is turned on (Step S6).

Then, similarly to the case of the step S2, the S-shaped signal is extracted from the obtained focus error signal. An amplitude value of the obtained S-shaped signal is assumed to be a value F, and it is temporarily stored in the above-mentioned memory in the servo IC 9 (Step S7). Then, the second laser diode 3B that is turned on is turned off (Step S8).

At this time, if the loaded optical disc 1 is, for example, the DVD(D), a focus error signal shown in a top portion of FIG. 4A is obtained in accordance with a change of a focus drive signal, which is a focus drive signal for driving the objective lens in the pickup 3 in the vertical direction to the optical disc 1, shown in a bottom portion of FIG. 4A, in the course of the executions at the steps S1 to S8. The value F corresponding to the obtained focus error signal is obtained as a value two times larger than the value E.

On the other hand, if the loaded optical disc 1 is, for example, the CD-R, a focus error signal shown in a top portion of FIG. 4B is obtained in accordance with a change of a focus drive signal shown in a bottom portion of FIG. 4B, in the course of the executions at the steps S1 to S8. The value F corresponding to the obtained focus error signal is obtained as a value smaller than the value E.

When the amplitude value F corresponding to the light beam having the wave length of 650 nano-meters and the amplitude value E corresponding to the light beam having the wave length of 780 nano-meters are obtained for the optical disc 1 loaded by the above-mentioned series of the processing, the type of the optical disc 1 is then determined in accordance with those amplitude ratios, specifically, the amplitude ratio indicated by F/E (Step S9).

As for the processing at this step S9, specifically, if the amplitude ratio is equal to or less than a threshold D shown in FIG. 1, the loaded optical disc 1 is determined to be the CD-R. If the amplitude ratio is greater than the threshold D and less than a threshold C, the loaded optical disc 1 is determined to be the DVD(D). If the amplitude ratio is greater than the threshold C and less than a threshold B, the loaded optical disc 1 is determined to be the CD or the CD-RW. If the amplitude ratio is greater than the threshold B and less than a threshold A, the loaded optical disc 1 is determined to be DVD(S) or the DVD-R. And, if the amplitude ratio is greater than the threshold A, the loaded optical disc 1 is determined to be the DVD-RW.

If the type is determined, the gain characteristics, the equalizer characteristics, etc. are set in the servo IC 9, in accordance with the determined result (Step S11). The information to be reproduced is reproduced (Step S11), and the type determining processing is terminated.

If the type can be specifically determined in the determination at the step S9, namely, if the optical disc 1 is the CD-R, the DVD(D) or the DVD-RW, the respective characteristics are set so as to be optimized for each determined type at the step S10. However, if the type can not be specifically determined in the determination at the step S9, namely, if the optical disc 1 is determined to be the CD or the CD-RW or deterimed to be the DVD(S) or the DVD-R, the processing on and after the step S10 is carried out so as to correspond to the determined type after one type is determined by using another method.

At this time, specifically, as another method, for example, as a method for determining whether the optical disc 1 is the CD or the CD-RW, a method using a difference between their reflection factors can be used. In this method, any one of light beams is radiated, the absolute values of their reflection lights are compared with each other, and accordingly discriminating between the CD and the CD-RW can be done.

Also, for example, as a method for determining whether the optical disc 1 is the DVD(S) or the DVD-R, a method using management information, which is management information describing the type of the optical disc, recorded in advance on each optical disc can be used. In this method, the management information read, then discriminating between the DVD(S) and the DVD-R) can be done in accordance with the read management information.

As described above, in the information reproducing processing involving the type determining processing in accordance with the embodiment determines the type of the optical disc 1 in accordance with the ratio between the amplitudes of the two S-shaped signals respectively generated by radiating the two kinds of the light beams to the optical disc 1. Thus, it can determine the kind optically easily and accurately.

Also, it is possible to determine whether the optical disc 1 is the CD-R or another information record medium except the CD-R. Thus, the determination of the CD-R, which was impossible until now, can be optically carried out.

Moreover, the type of the optical disc 1 is determined in accordance with the comparison between the preset thresholds A to D and the above-mentioned amplitude ratios. Thus, the type can be determined optically surely and simply.

Furthermore, the presence or absence of the loading of the optical disc 1 is determined prior to the determination of the type of the optical disc 1 by jointly using the obtained light beam B having the wave length of 780 nano-meters. Thus, it is possible to shorten the time until the start of the reproduction from the optical disc 1.

The above-mentioned embodiment describes the case in which the type determining processing is carried out by using the light beam B having the two kinds of the wave lengths. However, with regard to the wave length of the light beam B used in the type determining processing, if they are two kinds of wave lengths whose reflection factors to the optical disc targeted for the determination are different from each other, the wave length is not limited to the above-mentioned 650 nano-meters and 780 nano-meters.

(III) Variations

The variations corresponding to the present invention will be described below.

At first, a first variation will be described. In the embodiment, in order to jointly use the light beam B having the wave length of 780 nano-meters for the determination with regard to the presence or absence of the insertion of the optical disc 1, the first laser diode 3A is first turned on. However, if the determination with regard to the presence or absence of the insertion can be carried out by using another method, it can be designed so as to first turn on the second laser diode 3B and first obtain the amplitude value F.

Also, a second variation will be described. In the embodiment, the type is determined by using the light beam having the wave length of 780 nano-meters and the light beam having the wave length of 650 nano-meters. However, besides this method, it may be designed to use a first light beam whose wave length is within a range between 770 nano-meters and 795 nano-meters and a second light beam whose wave length is within a range between 630 nano-meters and 655 nano-meters, and calculate the amplitude values, and then determine the type in accordance with its ratio.

In this case, the type can be determined by jointly using the light beam used for the reproduction of the information from the optical disc 1. Thus, it is possible to simplify the configuration of the information reproducing apparatus itself.

Moreover, a third variation will be described. Not only the two kinds of light beams but also three or more kinds of light beams are sequentially used to obtain the amplitude values of the above-mentioned S-shaped signals corresponding to the respective types. Then, a ratio between the respective two amplitude values among them is calculated to be compared with a predetermined threshold. Accordingly, it is possible to determine a kind of an optical disc besides the above-mentioned seven types.

Furthermore, a fourth variation will be described. In the case of the third variation, if the light beam to be used for the reproduction after the type determination is last used in the determination of the type, the reproduction can be performed without switching the laser diode.

The fourth variation will be described more specifically by using the configuration of the information reproducing apparatus S in the embodiment. For example, assuming that, after the first laser diode 3A is turned on to determine the presence or absence of the loading of the optical disc 1, the first laser diode 3A and the second laser diode 3B are turned on one time respectively, regardless of order, in order to carry out the type determining processing. In this case, at the stage when the first laser diode 3A is turned on to determine the presence or absence of the optical disc 1, it is possible to determine whether the loaded optical disc 1 is any one of the CD, the CD-R and the CD-RW (hereafter, referred to as a CD type) or any one of the DVD(D), the DVD(S), the DVD-R and the DVD-RW (hereafter, referred to as a DVD type).

That is, as a signal generated when the light beam B having the wave length of 780 nano-meters is radiated to the optical disc, there is a so-called pseudo S-shaped signal generated by the reflection of the light beam B from a protection layer of each optical disc, in addition to the above-mentioned S-shaped signal generated by the reflection of the light beam B from a reflection film of each optical disc. However, a time until the original S-shaped signal is generated after the pseudo S-shaped signal is generated is different depending on a distance between the protection film and the reflection film This distance is different by two times between the CD type (1.2 mm) and the DVD type (0.6 mm). Thus, the laser diode that is used for the reproduction at the stage where the first laser diode 3A is turned on can be determined by detecting the time. If the loaded optical disc 1 is the CD type, the first laser diode 3A is used for the reproduction, and if the optical disc 1 is the DVD type, the second laser diode 3B is used for the reproduction.

Therefore, as for the order of turning on the laser diodes for the type determining processing, if the laser diode to be used for the reproduction after the determining processing is later turned on, the actual reproduction can be started without switching the laser diode.

The specific explanation of the fourth variation describes the case when the laser diode is turned on three times in all. However, besides it, if the type of the laser diode to be used after the kind determining processing is determined at the stage prior to the type determining processing by last turning on a laser diode to be later used in its type determining processing, the processing after the type determining processing can be performed without the above-mentioned switching. For example, the type can be determined from a physical shape of an optical disc 1 itself, or the type can be determined by a user's specification of a type of an optical disc 1 to be used, prior to the type determining processing.

Also, in the above-mentioned embodiment, the present invention is applied to the case when the information recorded in the optical disc 1 is reproduced. However, besides this case, as a fifth variation, if a necessary information is recorded in a recordable optical disc, the present invention can be applied to a determination of a type of an optical disc on which a recording operation as a preliminary processing is performed.

Moreover, a sixth variation will be designed as follows. That is, a program corresponding to the type determining process shown in FIG. 3 is recorded in an information record medium, such as a flexible disc, RAM (Random Access Memory), ROM (Read Only Memory) or the like. Then, this is read out by a CPU mounted in an information recording apparatus or an information reproducing apparatus, and executed so that the information recording apparatus or the information reproducing apparatus executes the type determining processing according to the embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-56066 filed on Feb. 28, 2000 including the specification, claims, drawings and summary is incorporated herein by reference in its entirety.

What is claimed is:

1. An apparatus for determining an information record medium, comprising:
    an emitting device for respectively emitting a plurality of light beams whose wave lengths are different from each other;
    a light receiving device for receiving respective reflection lights from an information record medium of the emitted respective light beams, and outputting light reception signals respectively corresponding to the received reflection lights; and
    a determining device for determining a type of the information record medium in accordance with a ratio between the outputted respective light reception signals.

2. Then apparatus for determining an information record medium, according to claim 1,
   wherein the emitting device respectively emits a first light beam and a second light beam in which their wave lengths are different from each other;
   the light receiving device receives a reflection light of the first light beam from the information record medium, and outputs a first light reception signal, and also receives a reflection light of the second light beam from the information record medium, and outputs a second light reception signal; and
   the determining device determines a type of the information record medium in accordance with a ratio between the first light reception signal and the second light reception signal.

3. The apparatus for determining an information record medium, according to claim 2,
   wherein a wave length of the first light beam is a wave length within a range between 770 nano-meters and 795 nano-meters, and a wave length of the second light beam is a wave length within a range between 630 nano-meters and 655 nano-meters.

4. The apparatus for determining an information record medium, according to claim 3,
   wherein the determining device determines whether the information record medium is CD-R or another information record medium except the CD-R.

5. The apparatus for determining an information record medium, according to claim 1,
   wherein the determining device compares the ratio with a predetermined threshold corresponding to a reflection factor of the light beam in the information record medium whose type should be determined, and so that it determines the type of the information record medium.

6. The apparatus for determining an information record medium, according to claim 1, further comprising a presence or absence determining device for determining a presence or absence of the information record medium, in accordance with any light reception signal of the outputted light reception signals, prior to a determination of the type.

7. The apparatus for determining an information record medium, according to claim 1,
   wherein the emitting device last emits the light beam, which is first used after the determination of the type, in the determination of the type.

8. A method of determining an information record medium, comprising the processes of:
   respectively emitting a plurality of light beams whose wave lengths are different from each other;
   receiving respective reflection lights from an information record medium of the emitted respective light beams, and outputting light reception signals respectively corresponding to the received reflection lights; and
   determining a type of the information record medium in accordance with a ratio between the outputted respective light reception signals.

9. The method of determining an information record medium, according to claim 8,
   wherein the process of emitting a plurality of light beams respectively emits a first light beam and a second light beam in which their wave lengths are different from each other;
   the process of receiving respective reflection lights receives a reflection light from the information record medium of the first light beam, and outputs a first light reception signal, and also receives a reflection light from the information record medium of the second light beam, and outputs a second light reception signal, and
   the process of determining the type determines the type in accordance with a ratio between the first light reception signal and the second light reception signal.

10. The method of determining an information record medium, according to claim 9,
    wherein a wave length of the first light beam is a wave length within a range between 770 nano-meters and 795 nano-meters, and a wave length of the second light beam is a wave length within a range between 630 nano-meters and 655 nano-meters.

11. The method of determining an information record medium, according to claim 10,
    wherein the process of determining the type determines whether the information record medium is CD-R or another information record medium except the CD-R.

12. The method of determining an information record medium, according to claim 8,
    wherein the process of determining the type compares the ratio with a predetermined threshold corresponding to a reflection factor of the light beam in the information record medium whose type should be determined, and so that it determines the type of the information record medium.

13. The method of determining an information record medium, according to claim 8, further comprising the process of determining a presence or absence of the information record medium, in accordance with any light reception signal of the outputted light reception signals, prior to a determination of the type.

14. The method of determining an information record medium, according to claim 8,
    wherein the process of emitting a plurality of light beams last emits the light beam, which is first used after the determination of the type, in the determination of the type.

15. The apparatus for determining an information record medium, according to claim 1,
    wherein the determining device determines whether the information record medium is CD-R or another information record medium except the CD-R.

16. The method of determining an information record medium, according to claim 8,
    wherein the process of determining the type determines whether the information record medium is CD-R or another information record medium except the CD-R.

* * * * *